United States Patent
Beaucamp

[15] 3,639,211
[45] Feb. 1, 1972

[54] PROCESS FOR THE PREPARATION OF CREATINE PHOSPHATE

[72] Inventor: Klaus Beaucamp, Tutzinglobb, Germany

[73] Assignee: Boehringer Mannheim GmbH, Mannheim-Waldhof, Germany

[22] Filed: Nov. 19, 1968

[21] Appl. No.: 792,182

[30] Foreign Application Priority Data

Nov. 29, 1967 Germany .....................P 16 43 701.7

[52] U.S. Cl.................................................195/29, 195/30
[51] Int. Cl. .......................................................C12d 13/06
[58] Field of Search ........................................195/28, 29, 30

[56] References Cited

OTHER PUBLICATIONS

Morrison et al., Biochem. J. vol. 79 pages 433– 446 (1961)

*Primary Examiner*—Alvin E. Tanenholtz
*Attorney*—Burgess, Dinklage & Sprung

[57] ABSTRACT

Process for preparing creatine phosphate comprising incubating in an alkaline medium creatine and 3-phosphoglyceric acid with an aqueous muscle extract in the presence of a catalytic amount of adenosine triphosphate, heating the resulting mixture for a short period of time to a temperature of 70° to 100° C. and recovering the creatine phosphate which is thereby formed.

11 Claims, No Drawings

PROCESS FOR THE PREPARATION OF CREATINE PHOSPHATE

This invention relates to a process for preparing creatine phosphate. More particularly this invention relates to a process for preparing creatine phosphate in an economically feasible manner and in large amounts.

It is in the prior art to prepare creatine phosphate by the phosphorylation of creatine with phosphoroxychloride (K. Zeile and G. Pawaz, Hoppe-Seyler's Zeitschrift fur physiologische Chemie 256, 193 (1938)). The principal disadvantages of this known process are:

a. Poor yield.
b. The reaction conditions must be maintained rather precisely in order to achieve even this low yield.
c. The method is not suitable for being carried out on a large scale, as the Na3 PO4 slurry that develops can neither be stirred nor cooled.

It is an object of this invention to provide a method of preparing creatine phosphate which can be carried out in a simple and economically feasible manner.

It is another object of the invention to provide a method of preparing creatine phosphate in high yields and which is suitable for operation on a large scale.

These and other objects will become apparent from consideration of the disclosure which follows.

In accordance with the invention, a method is provided for the preparation of creatine phosphate in practically unlimited quantities in an extremely simple manner and in excellent yields which is based on the enzymatic phosphorylation of creatine. The method comprises incubating creating and 3-phosphoglyceric acid with an aqueous muscle extract in the presence of a catalytic amount of adenosine triphosphate in an alkaline medium, thereafter heating briefly the solution at a temperature of 70° to 100° C. and isolating the creatine phosphate therefrom.

The enzymatic phosphorylation of creatine for the analytic determination of creatine in tissues has already been described (H. U. Bergmeyer, METHODEN DER ENZYMATISCHEN ANALYSE, Verlag Chemie, Academic Press, 1963, p. 407). This process, however, could not be used for preparation of creatin phosphate as it requires the use of highly expensive phosphoenolpyruvate and highly purified creatine phosphokinase, and further the reaction is hampered by serum components. Furthermore, at the concentrations which are required to be used, the isolation of creatine phosphate would be very expensive.

It was therefore very surprising to find that an enzymatic phosphorylation of creatine could be successfully carried out according to the method of the invention in an extremely simple manner with excellent yields, and without any of the difficulties or disadvantages described above.

It is also surprising that the enzymatic reaction can be interrupted by heating to the stated temperature as from the teaching of Zeile et al., it was to have been concluded that creatine phosphate is extremely sensitive to temperature, the chemical reaction being carried out at low temperature, or in any case at no higher than room temperature. The acid-sensitivity of phosphocreatine also bars the conventional methods of isolating organic phosphoric acid compounds, such as for example, the methods used in isolating nucleotides or sugar phosphates. Any acidification, be it ever so brief, and any exchange chromatography or passage through charcoal, results in considerable losses. Actually, as has now been found, creatine phosphate can withstand as much as 10 minutes of heating at 80° to 90° C, in the weakly alkaline range without perceptible losses.

The muscle extract which is used in the process of the invention can be easily prepared by extraction of fresh meat with water, for example, rabbit or veal, and filtering off the insoluble components. However, extracts of muscles of other origin can be used in place of the veal or rabbit extracts, with equal success. The important thing is for the muscle extract to contain a certain amount of creatine phosphokinase, although it may be very much less than the amount required according to the analytical procedure. One unit of creatine phosphokinase for every 1 to 10 mg. of creatine suffices for a satisfactory carrying out of the process of the invention. Larger amounts of the enzyme can, of course, be used; this results in a slight shortening of the time required for the reaction, but other than this it offers no other special advantages.

The use of a buffer is not necessary. It is advantageous to add magnesium and potassium ions if the concentration of these ions in the crude muscle extract is substantially less than 1 to $2\times10^{-3}$M. Increasing the concentrations above these values results in no special advantages.

Creatine and 3-phosphoglyceric acid are utilized in approximately equimolar ratio in the reaction. The reaction can easily be carried out using a slight excess of one of these two materials, until the complete reaction of the other reagent has been realized. Preferably, about 1.1 to 1.5 equivalents of creatine were used per equivalent of 3-phosphoglyceric acid in order to achieve the complete reaction of the latter. An excess of creatine is advantageous, as this is the substantially less costly of the two reagents.

Adenosine triphosphate is added only in catalytic quantities. About 1 equivalent of adenosine triphosphate is used for every 60 to 100 equivalents of creatine or 3-phosphoglyceric acid, as the case may be. The amount of adenosine triphosphate can, of course, be increased, although this is not desirable for economic reasons and technically it is not particularly advantageous. The amount of adenosine triphosphate can also be reduced, but this results in a longer reaction time.

As has already been indicated, the addition of buffer is not necessary. The desired alkaline pH can be obtained by adjustment with any alkaline substance, such as, for example, caustic soda solution.

The pH is advantageously maintained at between about 7.0 to 11, and preferably between 8 and 9. The reaction temperature is desirably kept at between room temperature and about 45° C., preferably between 32° C. and 40° C. The temperature can be increased above the just indicated range when a relatively C.

The reaction time depends on the temperature and on the amount of crude enzyme used. Using the preferred quantities of enzyme and using temperatures as stated above, the yield amounts to about 80 to 90 percent of theory following a reaction time of 1 hour. It is possible to extend the reaction time to 3 and, if desired, even to 4 hours under the conditions stated, to achieve a 100 percent yield.

When the reaction has proceeded and the desired conversion obtained, it is stopped by rapidly heating the reaction mixture to a temperature of 70° to 100° C, and preferably 80° to 90°° C. Protein is thereby coagulated and settles out, and is removed following cooling, by the conventional methods as for example by filtration.

The recovery of the creatine phosphate is carried out by separating the foreign ions, concentrating the solution, and thereafter precipitating out the creatine phosphate by the addition of alcohol or some other material that reduces its solubility in the solution, preferably accompanied by inoculation with creatine phosphate crystals.

The solution is then treated in a weakly alkaline pH range, preferably at a pH of 8 to 8.5 with a cation exchanger balanced with sodium ions. Preferably it is passed through an exchanger column, after which it is concentrated, and alcohol added until a clearly preceptible turbidity occurs. Preferably the mixture is inoculated with creatine phosphate and allowed to stand for a period of time in the cold state. The crude creatine phosphate crystalline mass that forms is then separated from the liquid phase and purified by one or two recrystallizations.

The following examples serve to explain the invention but are in nowise to be taken as a limitation thereof.

EXAMPLE 1 a. Preparation of a rabbit muscle extract

Rabbit muscle was chopped, homogenized and extracted with water. The pH of the resultant mixture was adjusted to 6.5 and heated for 15 minutes at 53° C. Precipitated protein was removed by centrifugation. Ammonium sulfate was added to the supernatant liquid to provide a 1.5 M concentration. Any protein which was precipitated out was centrifuged off and ammonium sulfate was added to the supernatant to provide a 3 M concentration and the ammonium sulfate paste thereby obtained dialyzed for 3 hours against tap water and used for the next reaction.

b. Preparation of creatine phosphate Two hundred sixty g. of creatine were dissolved in 100 liters of water, and 15 g. of $ATPNa_2H_2 \cdot H_2O$ (corresponding to about 12 g. of ATP), 380 g. of 3-phosphoglyceric acid sodium, 14 g. of magnesium acetate, 17 g. of potassium acetate and 80 g. of ammonium acetate were than added to the solution and the resulting batch mixed thoroughly. The pH was adjusted with soda lye to a value of 8.5 and the mixture heated to 37° C. Thereafter the enzyme mixture prepared as set out in (a) above was added. This enzyme mixture contained about 80,000 units of creatine phosphokinase, about 100,000 units of enolase, about 100,000 units of phosphoglycerate mutase and about 250,000 units of pyruvate kinase. The mixture was allowed to stand for 1 to 3 hours at 37° C. while maintaining the pH value constant.

Following the completion of the reaction, which could be followed by the enzymatic analysis of the creatine phosphate which formed, the mixture was heated rapidly to 80° to 90° C. and then cooled again. The protein which precipitated out was filtered off, if desired, and the remaining solution flowed through 10 litres of cation exchanger (e.g. Amberlite IR 120 or Dowex 50) which had been treated with sodium hydroxide and washed to provide a pH of 8–9. The yellowish clear liquid which emerged was collected and concentrated until the volume amounted to about 4 to 6 liters. Eight to 12 liters of alcohol were then added under agitation. When turbidity was observed to have set in, the mixture was inoculated with crystallized sodium creatine phosphate. The resulting mixture was allowed to stand overnight in the cold, the precipitated crystalline mass suction filtered and thoroughly washed with alcohol. After recrystallization the creatine phosphate was vacuum dried. The yield amounted to 300 to 350 g. of creatine phosphate ($COP-Na_2 \cdot 6H_2O$).

EXAMPLE 2

The same procedure was followed as has been described in example 1, using in place of the dialyzed crude rabbit enzyme, a veal extract, which was obtained by extracting freshly ground veal with twice the volume of water and filtering off the solids. The quantity of extract which was used was sufficient so as to supply 50,000 to 80,000 units of creatine phosphate.

The addition of magnesium and potassium ions could be omitted in this case since a sufficient amount of such ions were present in the extract.

The reaction took from 2 to 4 hours, and the yield amounted to 250 to 300 g. as further recrystallizations were necessary.

I claim:

1. Process for preparing creatine phosphate as crystallized sodium salt which comprises incubating in an alkaline medium an aqueous muscle extract containing creatine phosphokinase in an amount sufficient to supply one unit of creative phosphokinase for each 1 to 10 mg. creatine present with creatine and and 3-phosphoglyceric acid in the presence of a catalytic amount of adenosine triphosphate, heating the resulting solution for a short period of time to a temperature of 70° to 100 ° C. and thereafter recovering the creatine phosphate as crystallized sodium salt thereby formed from said solution.

2. Process according to claim 1 which comprises utilizing 1.1 to 1.5 equivalents of creatine per equivalent of 3-phosphoglyceric acid.

3. Process according to claim 1 which comprises utilizing said adenosine triphosphate disodium salt and creatine in a molar ratio of 1:60 to 1:100.

4. Process according to claim which comprises conducting said incubation at a pH of from 7.0 to 11.

5. Process according to claim 1 which comprises conducting said incubation at a pH of 8.0 to 9.0.

6. Process according to claim 1 which comprises conducting said incubation at a temperature ranging from room temperature to about 45° C.

7. Process according to claim 1 which comprises conducting said incubation at a room temperature of from 32° to 40° C.

8. Process according to claim 1 which comprises utilizing as said muscle extract an aqueous veal extract.

9. Process according to claim 1 which comprises utilizing as said muscle extract an aqueous rabbit extract.

10. Process according to claim 9 which comprises preparing said aqueous rabbit muscle extract by extracting homogenized rabbit muscle with water, heating the aqueous extract to a temperature of from about 50° to 60° C, separating off any precipitated protein, introducing ammonium sulfate into the supernatant liquid to provide a 3 M concentration, separating off any precipitated protein and dialyzing the same.

11. Process according to claim 1 which comprises adjusting the concentration of magnesium and potassium ions in said aqueous muscle extract to a value of $1-2 \times 10^{-3}$ for each of said ions.

* * * * *

UNITED STATES PATENT OFFICE
CERTIFICATE OF CORRECTION

Patent No. 3,639,211  Dated February 1, 1972

Inventor(s) Klaus Beaucamp

It is certified that error appears in the above-identified patent and that said Letters Patent are hereby corrected as shown below:

Col. 2, line 39 after "relatively" insert   --high enzyme concentration is used, and can even exceed by a slight amount 50°C.--

Col. 3, line 42

"(COP-Na2,6H$_2$O)."

should be   -- (CP-Na$_2$·6H$_2$O).--

Claim 1, line 14

Delete "and" (second occurrence)

Claim 4, line 1

After "claim" insert   -- 1 --

Signed and sealed this 27th day of February 1973.

(SEAL)
Attest:

EDWARD M. FLETCHER, JR.
Attesting Officer

ROBERT GOTTSCHALK
Commissioner of Patents